United States Patent [19]

McAlindon et al.

[11] 4,304,664
[45] Dec. 8, 1981

[54] FUEL STRAINER ASSEMBLY

[75] Inventors: Harold P. McAlindon, Flint; Carl E. Miller, Millington; Carl W. Norberg, Fenton, all of Mich.

[73] Assignee: General Motors Corporation, Detroit, Mich.

[21] Appl. No.: 146,479

[22] Filed: May 5, 1980

[51] Int. Cl.³ .................. E03B 11/00; B01D 35/02
[52] U.S. Cl. ................................ 210/172; 210/315; 210/460
[58] Field of Search .............. 210/172, 315, 416.4, 210/460, 488, 489, 799, DIG. 5, 335

[56] References Cited

U.S. PATENT DOCUMENTS

| 2,788,125 | 4/1957 | Webb | 210/460 |
| 3,108,065 | 10/1963 | McMichael | 210/460 |
| 3,826,372 | 7/1974 | Bell | 210/460 |
| 3,900,397 | 8/1975 | Bell | 210/416.4 |
| 4,145,285 | 3/1979 | Martin et al. | 210/315 |

*Primary Examiner*—Peter A. Hruskoci
*Attorney, Agent, or Firm*—D. D. McGraw

[57] ABSTRACT

A fuel strainer assembly having an inner sleeve and an outer sleeve, the outer sleeve acting to prohibit water from passing therethrough while allowing fuel to pass, and the inner sleeve acting to permit fuel to pass therethrough but prohibit diesel fuel oil wax crystals from doing so when the fuel oil being strained is below the cloud point at which the wax crystals tend to be formed. The assembly also provides for sufficient fuel to continue to be supplied to the fuel using means even is wax crystals clog the inner strainer sleeve.

3 Claims, 6 Drawing Figures

FUEL STRAINER ASSEMBLY

The invention relates to a fuel strainer assembly especially adapted for installation in a fuel tank containing liquid fuel such as diesel fuel oil, and more particularly to one having an outer strainer which is wetted by the liquid fuel but not by water so as to permit liquid fuel to flow through the open weave thereof to the interior of the outer strainer, and an inner strainer which has the capability of wicking fuel and has an open weave such that fuel can normally flow therethrough but any wax crystals precipitated from the fuel because of low temperature conditions cannot flow therethrough. The inner strainer has one or more openings at the lower portion thereof through which liquid fuel with wax crystals formed therein may pass when insufficient fuel can pass through the weave of the inner strainer. The fuel line leading from the assembly is connected through adjacent points on the walls of both the inner and outer strainers so that fuel is taken out of the strainers from the hollow space formed by the inner strainer. The opening at the lower part of the inner strainer is below the opening connecting to the fuel line.

Fuel strainers have been provided in fuel tanks in many production vehicles in which the strainer is a tube, sleeve or sock closed at each end and connected to a fuel pick-up line somewhere in the area of the middle portion of the strainer, the strainer being suspended in the tank at approximately a 45° angle. Such a single strainer normally has an open weave characteristic such that it will permit the liquid fuel to pass therethrough because it is wetted by the fuel, but will not permit any water in the fuel tank to pass therethrough. A complete discussion of in-tank fuel strainers of this type is found in a paper No. 790091 presented to and published by the Society of Automotive Engineers, Inc. (S.A.E.) in 1979. The paper is entitled, "The Parameters that Control the Performance of the In-Tank Fuel Strainer" and was authored by one of the inventors of the invention disclosed and claimed herein. The SAE paper discussed basic engineering factors required to understand how in-tank fuel strainers function and includes guidance in choosing fabrics and weaves that insure optimum performance for various types of liquid fuels. The strainer arrangements discussed by the paper involve only a single strainer or a sock. Such single strainers may be used with liquid fuel such as gasoline without any problem of wax crystal precipitation such as is found in typical diesel fuel oil.

The problem of diesel fuel oils reaching a cloud point at low temperatures and having wax crystals precipitate, with the resultant clogging of one or more portions of the fuel system such as the fuel filter or even portions of the fuel line, are discussed in an article appearing in the French publication "Ingenieurs De L'Automobile" for August/September 1979, beginning at page 477, written by an official of Mobil Oil of France. The article stated that this was an unsolved problem which should be solved cooperatively by automotive manufacturers, filter manufacturers, and fuel suppliers.

The fuel strainer assembly embodying the invention has been found to be effective in normally delivering fuel out of the fuel tank without wax crystals, even when the fuel temperature is below the cloud point, to such an extent that the fuel filter is not clogged, while providing for the possible circumstance of wax crystals clogging the inner strainer to such an extent that fuel supply would be threatened, and arranging for the delivery of fuel even with some wax crystals suspended therein, if necessary to continue to supply sufficient fuel to the engine for normal engine operation. The strainer assembly provides separate strainers for water separation and fuel wicking.

IN THE DRAWINGS

Figure 1:
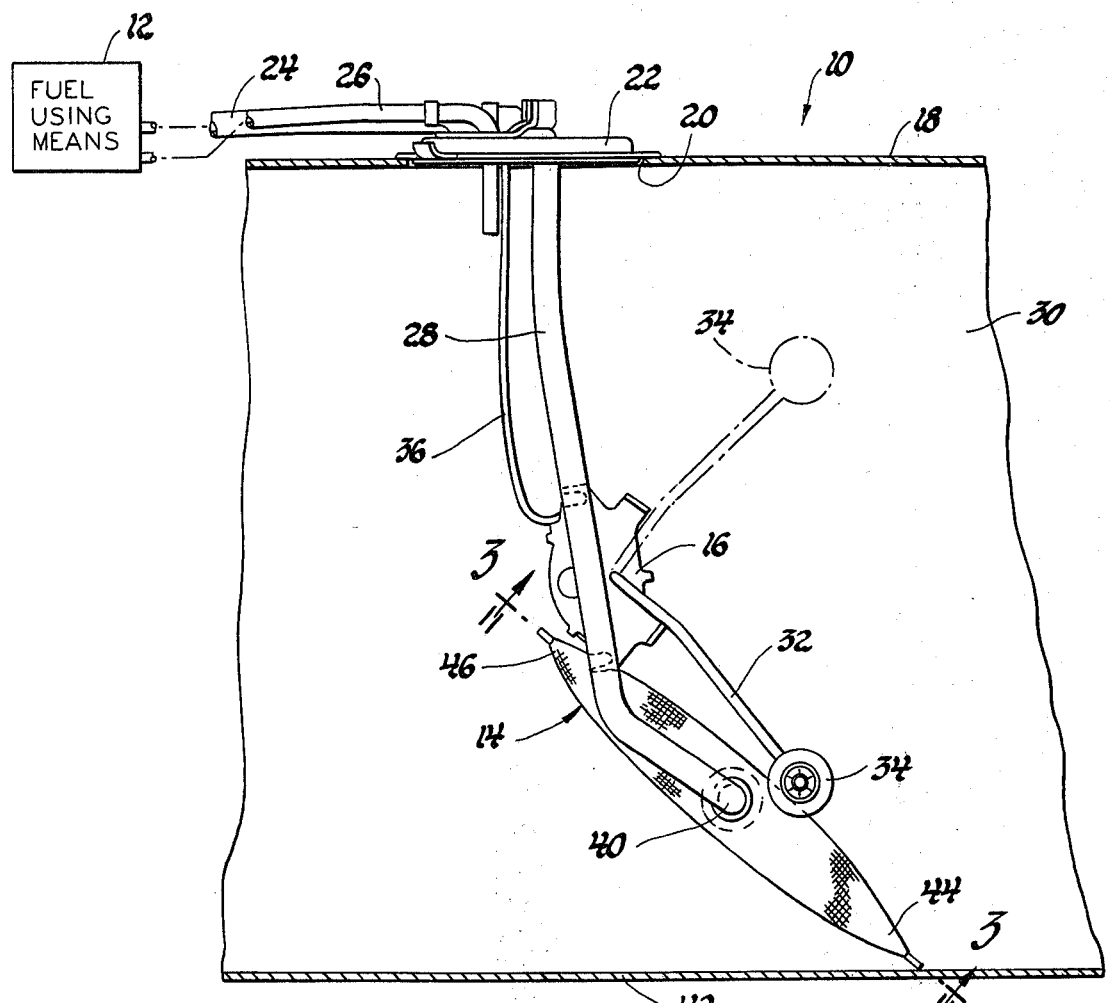
FIG. 1 is an elevation view of the fuel strainer assembly embodying the invention as installed in a fuel tank, with parts broken away and in section.

FIG. 1 schematically illustrates a fuel tank 10 and a fuel using means 12. These may typically be the fuel tank of an automotive vehicle and the vehicle engine. However, the invention is equally applicable to other engine and fuel tank installations which may be stationary, a part of a marine vessel, or used in heavy construction equipment, by way of example. In the use primarily contemplated, the system would be part of an automotive vehicle, whether a passenger car, truck or bus. It is also primarily applicable in engines using diesel fuel, but may be used with other liquid fuels.

The fuel strainer assembly 14 embodying the invention is illustrated as being installed in the tank 10 with a fuel level sender assembly 16 so that the two assemblies form a unit for installation and removal. The top 18 of the fuel tank is provided with an opening 20 which is closed by a cover 22 providing a mount and support plate for the unit formed by assemblies 14 and 16. Suitable sealing arrangements between the cover 22 and the tank top 18 are provided. A fuel supply tube 24 extends through cover 22 and is connected to the fuel using means 12. A fuel return tube 26 also extends through cover 22 and is connected to the fuel using means 12. Excess fuel provided to the fuel using means is returned to the interior of tank 10, as is common practice with fuel injection engines such as diesel engines and also with some other engines using other types of fuel. The fuel supply tube 24 provides a fuel pick-up line 28 as it extends downwardly into the interior 30 of tank 10. The fuel level sender assembly 16 is mounted on the pick-up line 28 so that the float arm 32 and the fuel level float 34 are properly positioned for their normal functions in sensing the level of fuel in the tank. Fuel level sensor wiring 36 connects the assembly 16 and a suitable terminal 38 on the outer side of cover 22 so that the information provided by the sender assembly 16 can be transmitted to the operator. The lower end of the fuel pick-up line 28 is so shaped that the tube end 40 extends generally horizontally and is spaced somewhat above the bottom 42 of tank 10. The tube end 40 is the fuel strainer assembly support, the fuel strainer assembly 14 being connected thereto as is better shown in FIGS. 2 and 3.

Fuel strainer assembly 14 is illustrated in FIG. 1 as being elongated and supported within tank 10 at approximately a 45° angle relative to tank bottom 42 with the strainer assembly lower end 44 engaging or being immediately adjacent tank bottom 42. The strainer assembly upper end 46 is located well above tube end 40.

Figure 3:
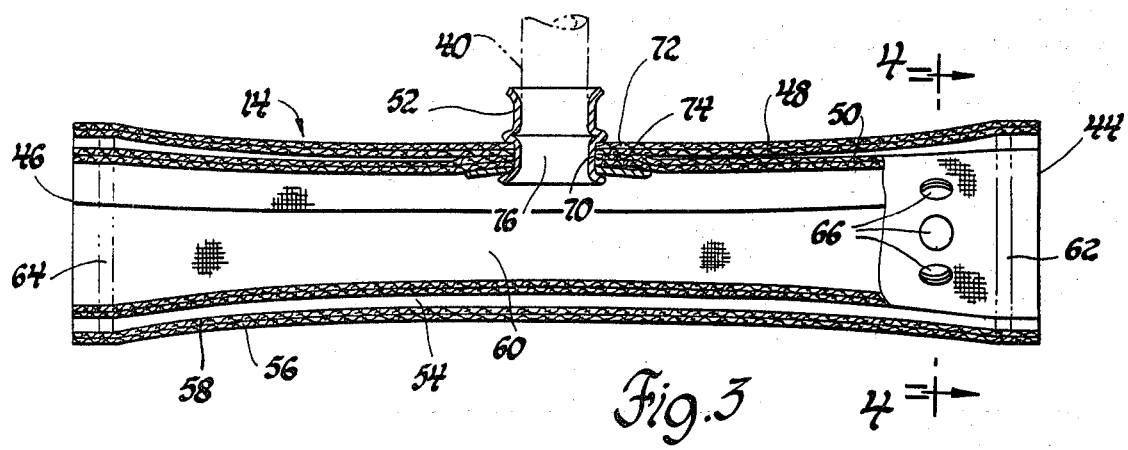
FIG. 3 is a cross section view of the fuel strainer assembly embodying the invention taken in the direction of arrows 3—3 of FIG. 1 and having parts broken away.
Figure 4:
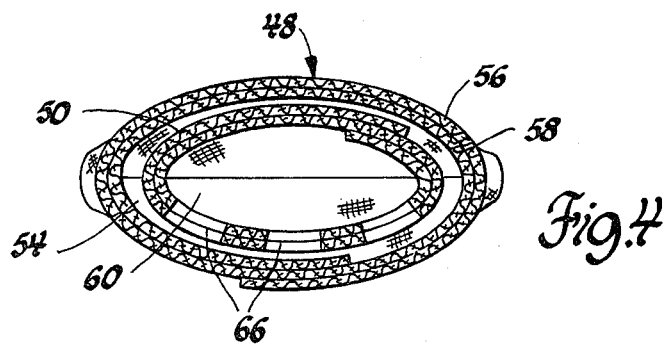
FIG. 4 is a cross section view of the fuel strainer assembly embodying the invention and taken in the direction of arrows 4—4 of FIG. 3.

The fuel strainer assembly 14 is illustrated in greater detail in FIGS. 3 and 4. The assembly includes an outer strainer 48, an inner strainer 50, and a fuel passage member 52 which serves as a mounting ferrule fitting over the tube end 40 and holding the strainer assembly in position on the tube end.

The material of which the strainer fabrics are made is preferably polyvinylidene chloride (PVdC) because this polymer does not swell or decompose when immersed in hydrocarbons and water. The fabrics typically are a square mesh plain-weave with an appropriate range of pore size-to-fiber diameter. Strainer element flexibility is preserved while maintaining fixed fiber spacings. While other materials may be used, as set forth in the SAE paper mentioned above, the material used should have a critical surface tension which is less than the surface tension of water (or aqueous solutions that might be encountered) yet larger than the surface tension of the fuel. The material should not be soluble, plasticised or swollen by either fuel or water. Other guidelines are found in the SAE paper for selection of strainer material and construction.

The outer strainer 48 is formed of one or more layers of woven fabric having the characteristic of being wetted by fuel but not by water. In the preferred embodiments illustrated, this strainer is formed like a sock or sleeve so that a hollow space 54 is provided inside the strainer. As illustrated in FIG. 4, the outer strainer is preferably made with two fabric layers 56 and 58, the fabric being wrapped and overlapped to obtain this construction. It has been found that the outer strainer 48 may have a nominal pore width of about 280 microns and function effectively to be wetted by fuel so as to pass fuel therethrough but to repel water so that water does not pass into hollow space 54.

The inner strainer 50 is constructed in a manner similar to the outer strainer 48. The design parameters are selected for fuel wetting and fuel wicking capability. A fuel strainer must maintain adequate volumetric fuel flow for all operating conditions including low fuel levels. This means that the strainer serves as a conduit for liquid where the driving forces result from having capillarity and fuel pump pressure. The capillary forces pulling fuel uniformly upward across the entire fabric also produces a barrier against the entry of air into the fuel stream. It has been found that when the strainer 50 is made of PVdC and has a 130 micron nominal pore width and a 150 micron fiber diameter it will provide satisfactory diesel fuel wicking. Because of the existence of capillary pressure and its tendency to push the fibers together, the fibers must be rigidly held in position by the geometrical constraints of the textile weave and by the intrinsic rigidity of the polymer material. The pores must not be permitted to vary in size so as to decrease fuel wicking and water repellancy capacities.

Figure 5:
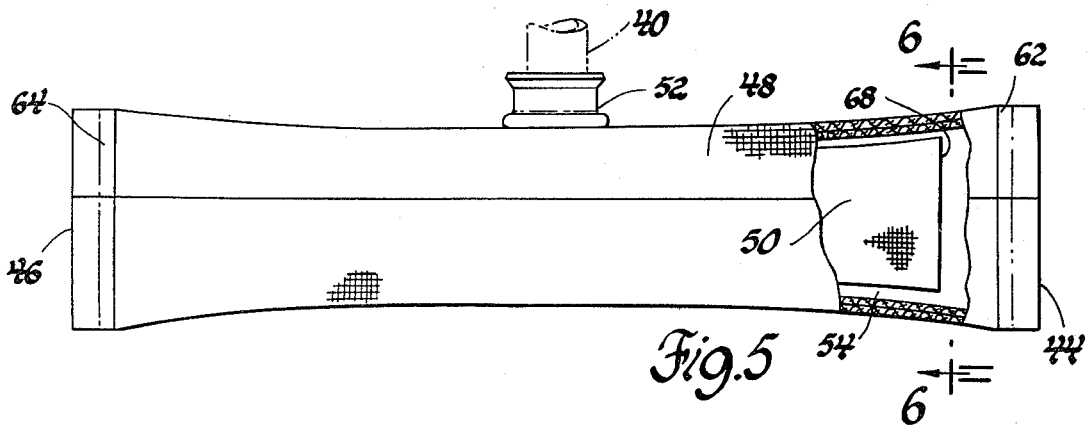
FIG. 5 is a view similar to the view in FIG. 3, showing a modified fuel strainer assembly in elevation with parts broken away and in section.
Figure 6:
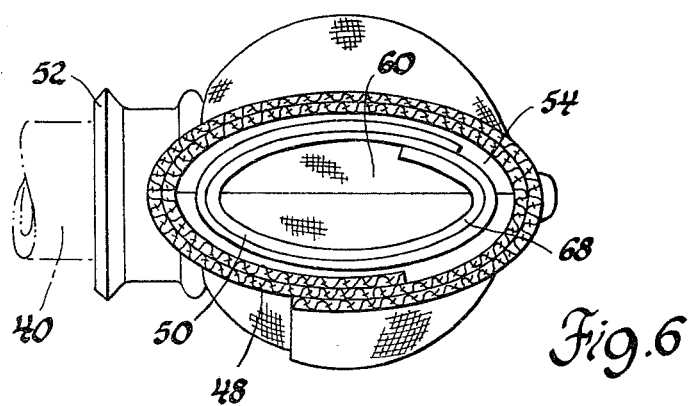
FIG. 6 is a cross section view of the fuel strainer assembly of FIG. 5 taken in the direction of arrows 6—6 of that FIGURE.

The inner strainer 50 also defines a hollow space 60. The inner strainer 50 is received within the outer strainer 48 and is somewhat smaller in diameter so that hollow space 54 is generally annular in cross section, the fabrics of the two strainers being so separated from each other that fuel passing through the outer strainer 48 is contained within the annular hollow space between the two strainers. As illustrated in FIGS. 3 and 4, the inner and outer strainer lower ends are sealed as illustrated at 62 and their upper ends are sealed as illustrated at 64. One or more openings 66, with three such openings being illustrated, are provided in the fabric of the inner strainer 50 near the sealed lower end 62 so as to provide direct fluid communication between the hollow space 54 and the hollow space 60 at the lower end 44 of the strainer assembly. The modification shown in FIGS. 5 and 6 has the lower end of the inner strainer 50 terminating within hollow space 54 and slightly short of the sealed end 62 so that the open end 68 provides an opening defining a fluid communication passage between hollow space 54 and hollow space 60 adjacent the lower end 44 of the strainer assembly.

Figure 2:
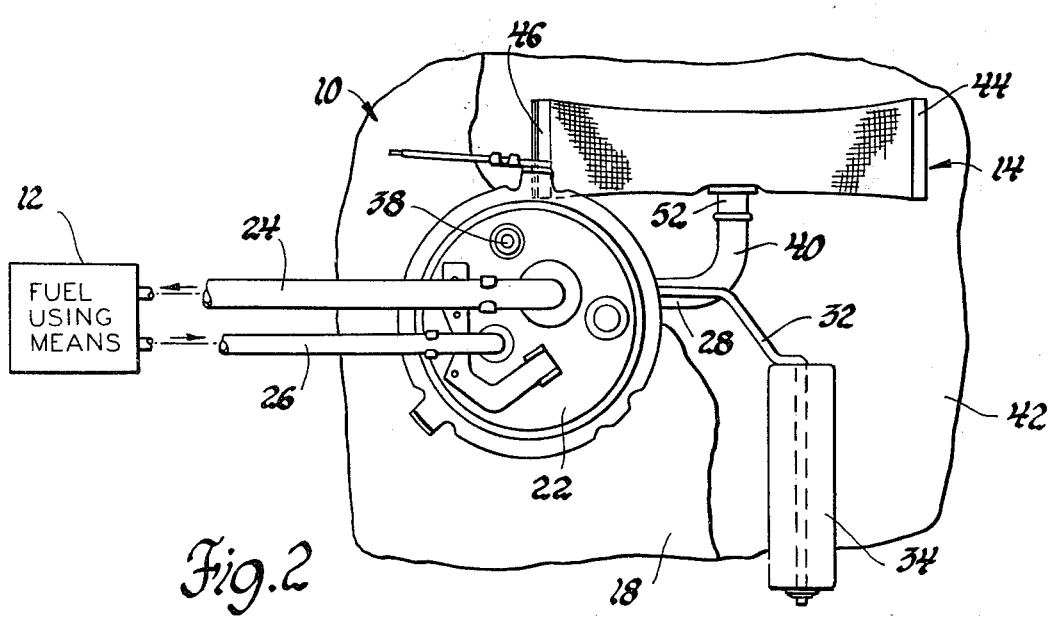
FIG. 2 is a plan view of the fuel strainer assembly of FIG. 1, with parts broken away.

A ferrule providing the fuel passage member 52 is secured in an opening 70 made at about the axial midpoint of the outer strainer 48 and inner strainer 50. Member 52 secures the outer strainer wall portion 72 and the inner strainer wall portion 74 tightly together so that there is no leakage through the opening 70 forming these wall portions, and the passage 76 defined by member 52 communicates only with the hollow space 60. The member 52 receives the tube end 40 therein so that the strainer assembly is mounted in the desired orientation within the fuel tank as illustrated in FIGS. 1 and 2.

Fuel in the interior 30 of tank 10 may have some water in it, caused by condensation within the tank or at times having been mixed with the fuel before the fuel was placed in the tank. The water, being heavier than the fuel, will settle to the bottom of the tank. Therefore there is a line of demarcation or separation between the fuel and the water which may extend well above the strainer lower end 44. When the strainer assembly is made of the proper materials and fabric constructions, the assembly will continue to provide fuel to the fuel pick-up line 26 from the hollow space 60 even if the fuel/water line of demarcation is above the location of the passage member 52. In typical automotive vehicle installations, it has been found that the strainer will perform satisfactorily even if there is only 3 to 5 centimeters of the upper end portion of the strainer assembly extending into the fuel above the fuel/water line of demarcation.

The strainer assembly will also provide fuel to the fuel pick-up line 26 even when the fuel level is somewhat below the location of passage member 52, depending upon the wicking capability of the inner strainer 50. As set forth in greater detail in the above noted SAE paper, a diesel fuel wicking height of 4.4 centimeters has been sustained with a PVdC filter having a 130 micron nominal pore width and 150 micron fiber diameter.

The strainer assembly embodying the invention performs the desirable features of fuel wetting, water repellancy and fuel wicking. The outer strainer is provided with the desirable fuel wetting capability which will prevent water from passing therethrough but will pass fuel such as diesel oil therethrough, whether or not the diesel fuel oil is at or below the cloud point so that wax crystals have formed therein. The inner strainer is also wetted by the diesel fuel oil so as to pass the liquid fuel therethrough but has pore and fiber diameter characteristics such that it prevents the wax crystals from passing therethrough. It will therefore tend to filter out the wax crystals so that they do not enter the fuel line leading to the fuel using means or engine 12 and do not tend to clog the fuel line or the fuel filter adjacent the engine. Therefore they will not tend to clog the fuel return tube. Of course, both strainers will tend to strain out solid impurities which may be found in the fuel. Should the inner strainer 50 become sufficiently clogged by wax crystals, for example, so that it does not provide sufficient liquid fuel through the strainer fabric to the member 52 and therefore to the fuel pick-up line 28, the fuel within the hollow space 54 will pass through the openings 66 or the open end 68 and into the hollow space 60. The fuel will then be transported upwardly through the inner strainer 50 and out through passage member 52 to the fuel pick-up tube 28. If the fuel level is sufficiently high, no wicking action will be required. However, if the fuel level is so low that the upper fuel surface is below the level of passage member 52, the fuel in hollow space 60 will be transported upwardly by wicking action and in sufficient quantity to supply the fuel using means 12 with its requirements, so long as the upper surface of the fuel in hollow space 54 is above openings 66 or opening 68.

The embodiments of the invention in which an exclusive property or privilege is claimed are defined as follows:

1. A fuel strainer assembly especially adapted for use in liquid fuel such as diesel oil having the characteristic of forming wax crystals or the like at a predetermined low temperature and further adapted to be connected to a fuel line for delivery of fuel with or without said wax crystals to fuel using means, said assembly comprising:
   a hollow outer strainer formed of one or more layers of woven fabric having the characteristic of being wetted by fuel but not by water by having a weave sufficiently open to pass fuel through the openings of the weave into the hollow of the outer strainer while preventing water from passing through said openings, said outer strainer being sealed so that all fuel passing into the hollow thereof must pass through said openings of the weave;
   a hollow inner strainer formed of one or more layers of open weave fabric having the characteristics of effectively wicking fuel and preventing said wax crystals from passing through said open weave fabric while permitting liquid fuel to pass therethrough, said inner strainer being received within the hollow of said outer strainer, said inner strainer having at least one opening in its fabric providing direct fluid communication between said hollow of the outer strainer and the hollow of the inner strainer and permitting any fuel with wax crystals contained between said inner and outer strainers to pass through said inner strainer into the hollow thereof; and
   a fuel passage member secured to and extending through adjacent wall portions of said inner and outer strainers at a point intermediate the uppermost and lowermost portions of said strainers and above said at least one opening and communicating with the hollow of said inner strainer at a level above said at least one opening so that fuel without wax crystals may be delivered to said fuel using means at temperatures above said predetermined low temperature and at temperatures below said predetermined low temperature when sufficient fuel to supply said fuel using means can pass through said inner strainer fabric while leaving wax crystals outside said inner strainer fabric, and so that fuel with wax crystals may be delivered to said fuel using means at or below said predetermined low temperature via said at least one opening when wax crystals block required fuel flow through said inner strainer fabric.

2. A fuel strainer assembly especially adapted for use in liquid fuel such as diesel oil having the characteristic of forming wax crystals or the like at a predetermined low temperature and further adapted to be connected to a fuel line for delivery of fuel with or without said wax crystals to fuel using means, said assembly comprising:
   a hollow outer strainer formed of one or more layers of woven fabric having the characteristic of being wetted by fuel but not by water by having a weave sufficiently open to pass fuel through the openings of the weave into the hollow of the outer strainer while preventing water from passing through said openings, said outer strainer being generally elongated and sealed at the ends thereof so that all fuel passing into the hollow thereof must pass through said openings of the weave;
   a hollow inner strainer formed of one or more layers of open weave fabric and having the characteristics of effectively wicking fuel and preventing said wax crystals from passing through said open weave fabric while permitting liquid fuel to pass therethrough, said inner strainer being generally elongated and received within the hollow of said outer strainer, said inner strainer having at least one opening in its fabric providing direct fluid communication between said hollow of the outer strainer and the hollow of the inner strainer and permitting any fuel with wax crystals contained between said inner and outer strainers to pass through said inner strainer into the hollow thereof; and
   a fuel passage member secured to and extending through adjacent wall portions of said inner and outer strainers at a point intermediate the strainer ends and communicating with the hollow of said inner strainer at a level above said at least one opening so that fuel without wax crystals may be delivered to said fuel using means at temperatures above said predetermined low temperature and at temperatures below said predetermined low temperature when sufficient fuel to supply said fuel using means can pass through said inner strainer fabric while leaving wax crystals outside said inner strainer fabric, and so that fuel with wax crystals may be delivered to said fuel using means at or below said predetermined low temperature via said at least one opening when wax crystals block required fuel flow through said inner strainer fabric.

3. A fuel strainer assembly especially adapted for use in liquid fuel such as diesel oil having the characteristic of forming wax crystals or the like at a predetermined low temperature and further adapted to be connected to a fuel line for delivery of fuel with or without said wax crystals to fuel using means, said assembly comprising:
   a hollow outer strainer formed of one or more layers of woven fabric having the characteristic of being wetted by fuel but not by water by having a weave sufficiently open to pass fuel including wax crystals formed therein through the openings of the weave into the hollow of the outer strainer while preventing water from passing through said openings, said outer strainer being generally elongated and sealed at the ends thereof so that all fuel passing into the hollow thereof must pass through said openings of the weave;

a hollow inner strainer formed of one or more layers of fabric having the characteristic of effectively wicking fuel and having a weave sufficiently open to pass fuel without wax crystals therethrough but to not pass said wax crystals therethrough when said wax crystals are in said fuel, said inner strainer being generally elongated and received within the hollow of said outer strainer, said inner strainer having at least one opening in its fabric providing direct fluid communication between said hollow of the outer strainer and the hollow of the inner strainer and permitting any fuel with wax crystals contained between said inner and outer strainers to pass through said inner strainer into the hollow thereof irrespective of the formation of wax crystals therein; and a fuel passage member secured to and extending through adjacent wall portions of said inner and outer strainers at a point intermediate the strainer ends and communicating with the hollow of said inner strainer at a level above said at least one opening so that fuel without wax crystals may be delivered to said fuel using means at temperatures above said predetermined low temperature and at temperatures below said predetermined low temperature when sufficient fuel to supply said fuel using means can pass through said inner strainer fabric while leaving wax crystals outside said inner strainer fabric, and so that fuel with wax crystals may be delivered to said fuel using means at or below said predetermined low temperature via said at least one opening when wax crystals block required fuel flow through said inner strainer fabric.

* * * * *